(12) United States Patent
Miller

(10) Patent No.: US 9,651,448 B1
(45) Date of Patent: May 16, 2017

(54) LINER SYSTEM FOR DETECTION OF LEAKS OR THE PRESENCE OF WATER

(71) Applicant: Lane Enterprises, Inc., Camp Hill, PA (US)

(72) Inventor: Kevin Marshall Miller, Spring, TX (US)

(73) Assignee: Lane Enterprises, Inc., Camp Hill, PA (US)

( * ) Notice: Subject to any disclaimer, the term of this patent is extended or adjusted under 35 U.S.C. 154(b) by 0 days.

(21) Appl. No.: 14/977,715

(22) Filed: Dec. 22, 2015

Related U.S. Application Data

(60) Provisional application No. 62/096,603, filed on Dec. 24, 2014.

(51) Int. Cl.
  *G01M 3/40* (2006.01)
  *E02B 3/12* (2006.01)
  *E02B 11/00* (2006.01)

(52) U.S. Cl.
  CPC .............. *G01M 3/40* (2013.01); *E02B 3/121* (2013.01); *E02B 11/00* (2013.01)

(58) Field of Classification Search
  USPC .... 405/54, 55, 115, 129.6, 129.75; 340/604, 340/605
  See application file for complete search history.

(56) References Cited

U.S. PATENT DOCUMENTS

| | | | |
|---|---|---|---|
| 5,288,168 A | 2/1994 | Spencer | |
| 5,396,744 A * | 3/1995 | Mosley | E02D 31/00 204/242 |
| 5,663,490 A * | 9/1997 | Kozen | G01M 3/002 405/54 |
| 2005/0248356 A1* | 11/2005 | Care | G01B 7/06 324/686 |
| 2013/0134992 A1* | 5/2013 | Zhu | G01M 3/18 324/658 |
| 2014/0238511 A1* | 8/2014 | Klicpera | E03B 7/071 137/551 |

FOREIGN PATENT DOCUMENTS

EP    1387156 B1    2/2004

* cited by examiner

*Primary Examiner* — Sean Andrish
(74) *Attorney, Agent, or Firm* — Hooker & Habib, P.C.

(57) ABSTRACT

A liner system for detecting the presence or absence of water in soil includes a liner having opposite electrically conductive layers separated by an insulating layer, a number of electrodes embedded in the conductive layers, and a number of electric field detectors embedded in one of the conductive layers.

20 Claims, 2 Drawing Sheets

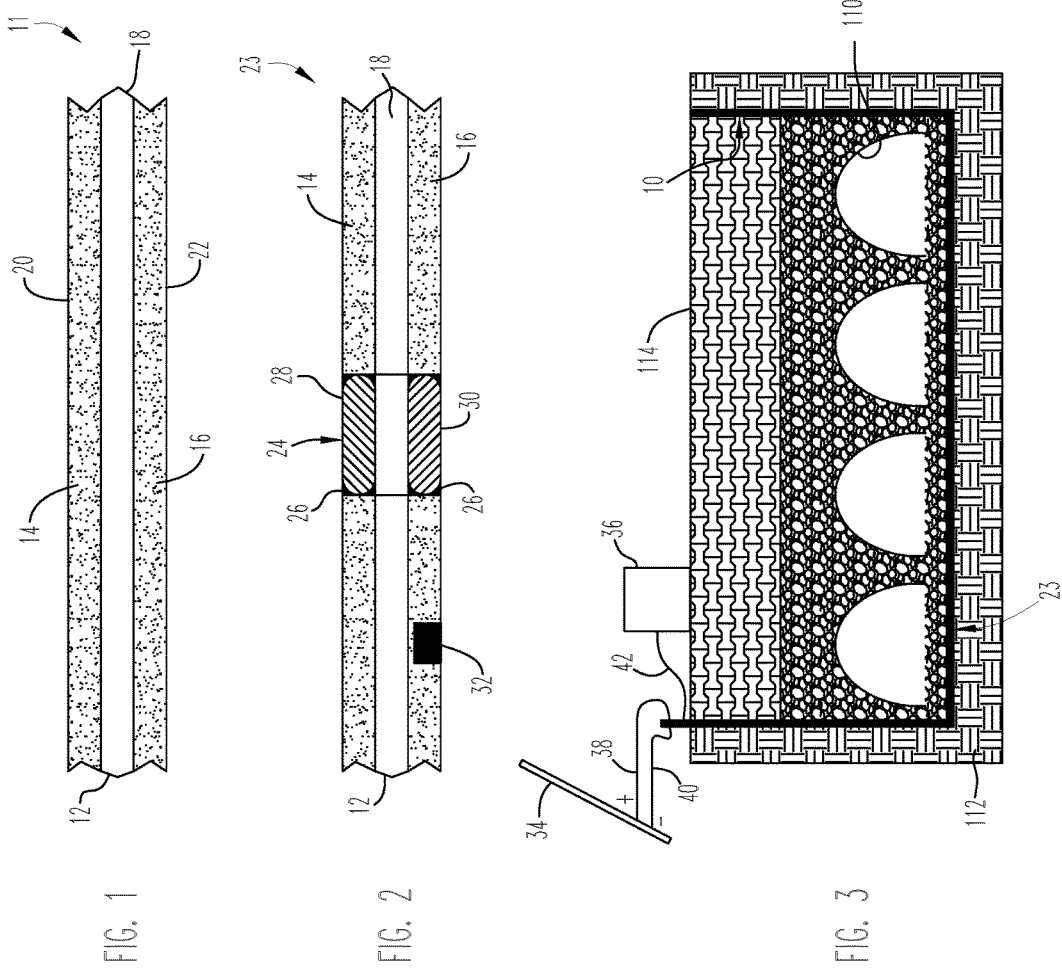

LINER SYSTEM FOR DETECTION OF LEAKS OR THE PRESENCE OF WATER

RELATED APPLICATION

This application claims priority from U.S. Provisional Patent Application No. 62/096,603 "Water-Impermeable Membrane Apparatus for Detection of Leaks or the Presence of Water" filed Dec. 24, 2014, which priority application is incorporated by reference as if fully set forth herein.

FIELD OF THE DISCLOSURE

The disclosure relates to liners or similar membranes for storm water management systems and other water containment systems that provide an impermeable barrier between the water contained in the system and the underlying soil, and in particular, to a liner system that enables detection of liner leaks or to the presence or absence of water in the vicinity of the liner.

BACKGROUND OF THE DISCLOSURE

Liners or similar membranes for storm water management systems and other water containment systems provide an impermeable barrier between the water contained in the system and the underlying soil.

Spencer U.S. Pat. No. 5,288,168 discloses a liner having an electrically conductive layer on a bottom, outer side of the liner. The conductive layer includes conductive particles embedded in the liner layer. The integrity of the liner is monitored by establishing an electric field across the sheet using a high-voltage power source and monitoring for sparks between a probe and the bottom of the liner. See also American Society for Testing and Materials (ASTM) standard ASTM 7240, "Standard Practice for Leak Location using Geomembranes with an Insulating Layer in Intimate Contact with a Conductive Layer via Electrical Capacitance Technique (Conductive Geomembrane Spark Test)."

Texplor GmbH, a German corporation, utilizes a system for detecting water leaks in soil disclosed in European patent document EP1387156A1, "Method and device for determining the existences of leaks in blocking walls", which patent document is incorporated by reference as if fully set forth herein. Two spaced apart electrodes are in electrical contact with the soil. A relatively low voltage difference (for non-limiting examples, 150 millivolts or 200 millivolts) is impressed on the two electrodes by an AC or DC power source and causes current flow in the soil between the two electrodes. The current flow generates an electric field. A transducer electrically coupled to one of the electrode is moved along the soil surface between the two electrodes. Where there is a water leak into the soil, the electric field is disturbed. The field disturbance is detected by monitoring the transducer output to locate the source of the water leak.

The Spencer and Texplor systems for detecting holes or leaks in liners require moving a probe or transducer over the area being monitored for leaks. There is a need for an improved liner system that allows for remote monitoring of the liner for leaks without the need for manual manipulation and handling of probes or transducers.

SUMMARY OF THE DISCLOSURE

Disclosed is a liner system that includes a water-impermeable liner, one or more water-impermeable sensors embedded in or attached to the liner, and one or more electric field detectors embedded in or attached to the liner. In an embodiment the liner includes an electrically conductive top layer and an electrically conductive bottom layer separated by a non-conductive middle layer. Each sensor includes a pair of electrodes embedded in or otherwise electrically connected to respective upper and lower layers of the liner. The electric field detectors are embedded in or attached to one of the conductive layers of the liner and thus electrically connected through that conductive layer to the electrodes associated with that layer.

In embodiments, the pairs of electrodes are embedded in the upper and lower conductive layers of the liner. Each electrode is attached to the liner layer by a weld joint that forms a waterproof connection between the electrode and the liner layer.

The liner in embodiments is formed in the manner disclosed in the above-referenced Spencer patent but with top and bottom electrically conductive layer rather than just a single electrically conductive layer. Alternatively, two of the liners disclosed in the Spencer patent could be laid on top of one another and made an integral member using glue, adhesive, or welding using heat fusion or extrusion methods. Liners formed with a single electrically conductive surface that can be adapted for use in the disclosed liner system are also available commercially from GSE Environmental, LLC, Houston, Tex., USA.

The sensor in possible embodiments is a sensing device of the type utilized in the Trexlor GmbH system that is available commercially from Texplor GmbH or Texplor Exploration & Environmental Technology GmbH, Potsdam, Germany.

The electric field detector in possible embodiments is a Trexlor GmbH-type detector referenced above and is available commercially from Texplor GmbH or Texplor Exploration & Environmental Technology GmbH, Potsdam, Germany. The detectors are preferably embedded in or attached to one of the conductive layers of the liner and thus electrically connected through that conductive layer to the electrodes associated with that layer.

To use the liner system, a power source applies a voltage difference to the top and bottom surfaces of the liner and thereby generates a voltage difference between each of the pairs of sensor electrodes. The current flow between pairs of electrodes in turn generates electric fields extending between the top and bottom surfaces of the liner. The electric field detectors are connected to an external monitoring station and transmit data by wire or wirelessly to the monitoring station representing the operating state of the electric field in the vicinity of the sensors.

In embodiments, the power source may derive its energy from a solar cell or the like with a battery backup. In other embodiments the power source may be powered from the power grid or from other suitable energy sources.

A first embodiment liner system has a liner forms part of an impermeable barrier for use, for example, as a water barrier in storm water management systems or other fluid containment systems. In use as a barrier, the top surface of the liner is normally wet and the bottom surface of the liner is normally relatively dry. The electric field detectors detect the electrical field in a first operating condition representing that the liner surfaces have structural integrity and the liner is not leaking. If, for example, a liner leak causes water to electrically connect the top and bottom surfaces of the liner, the electric field in the vicinity of the leak is disturbed and is placed in a second operating state. The electric field detectors in the vicinity of the leak detect the change in electric field from the first operating state to the second operating state and pinpoint the location of the leak.

In a second embodiment liner system the liner includes through-holes or openings that extend through the liner and fluidly connect the upper and lower surfaces of the liner. The liner forms a permeable barrier that allows water to pass through the liner.

When the liner is dry, the electric field detectors indicate a first operating condition representing a dry condition of the liner. When the liner becomes wet (that is, both sides of the liner are in contact with water) the electric field detectors indicate a second operating condition representing a wet condition of the liner. This enables the liner to act as a water sensor or water detector over its entire area.

Other objects and features of the disclosure will become apparent as the description proceeds, especially when taken in conjunction with the accompanying one or more drawing sheets illustrating one or more illustrative embodiments.

BRIEF SUMMARY OF THE DRAWINGS

FIG. 1 is a sectional view through the thickness of an impermeable liner used in forming the disclosed liner system;

FIG. 2 is similar to FIG. 1 but illustrates a sensor and an electric field detector embedded in the liner to form a liner assembly;

FIG. 3 is a sectional view of a storm water management system that utilizes a first embodiment liner system that includes the liner assembly shown in FIG. 2 to form an impermeable barrier between stored storm water and the surrounding soil;

DETAILED DESCRIPTION

Figure 4:
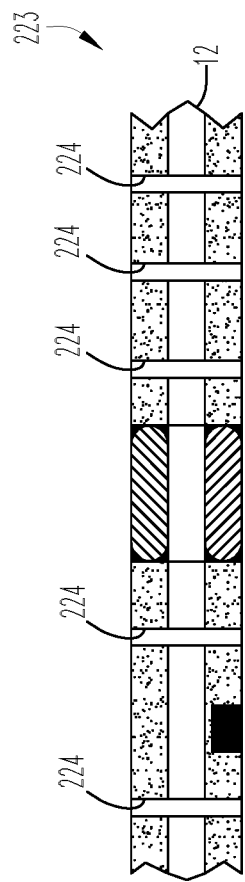
FIG. 4 is a sectional view similar to FIG. 2 that includes through-holes or openings that extend the thickness of the liner to form a permeable liner assembly for use in a second embodiment liner system.

FIG. 1 is a sectional view through the thickness of an impermeable liner 11 used in forming part of a first embodiment liner system 10 (shown in use in FIG. 3). The liner 11 has a width dimension extending parallel with the drawing sheet and a length dimension perpendicular to the drawing sheet. The illustrated liner 11 is essentially rectangular in shape but the liner 11 can in other embodiments be circular or polygonal in shape or have irregular width and/or length dimensions.

The liner 11 is intended to be used as a water barrier and is formed from a water-impermeable HDPE (high-density polyurethane) sheet 12. The sheet 12 includes electrically conductive top and bottom layers 14, 16 separated by a middle insulating layer 18. The conductive layers 14, 16 can in embodiments be formed by including conductive carbon black in the plastic forming the conductive layers and not including conductive carbon black in the insulation layer 18 that separates the top and bottom layers. Multiple sheets 12 can be joined together to form a liner 11 that covers a desired area.

The illustrated liner 11 has a minimum thickness of 0.040 inches between opposite upper and lower liner sides 20, 22 to enable the liner to function effectively as a water barrier.

FIG. 2 illustrates the liner 11 being modified to form a liner assembly 23 that is a component of the liner system 10.

The liner assembly 23 enables the liner system 10 to monitor the liner 11 for water leaks as will be described in more detail below.

A number of water-impermeable sensors 24 are embedded in the sheet 12. The sensors 24 are attached to the sheet 12 by plastic welds 26. The welds 26 prevent leaks through the sheet 12 around the sensors 24. Each sensor 24 includes a top electrode 28 embedded in the top liner layer 14 and a bottom electrode 30 embedded in the bottom liner layer 16. The top electrode 28 is in electrical communication with the conductive layer 14 and the bottom electrode 30 is in electrical communication with the conductive layer 16. The electrodes 28, 30 are electrically isolated from one another by the middle insulation layer 18. The sensors 24 are spaced apart from one another and define a two-dimensional array of sensors 24 throughout the width and length of the sheet 12.

The illustrated sensors 24 are conventional sensors available from Texplor GmbH.

Also embedded in the bottom conductive layer 16 are a number of electric field detectors 32 that individually monitor the strength of the electric field in the vicinity of the detector. The detectors 32 are spaced apart from the electrodes 30. The detectors 32 are in electrical communication with the bottom conductive layer 16 and are in electrical connection with the electrodes 30 through the bottom layer 14. The detectors 32 are electrically isolated from the top conductive layer 16 and the electrodes 28 by the middle insulation layer 18. The detectors 32 are spaced apart from one another and define a two-dimensional array of detectors 32 throughout the width and length of the sheet 12.

The illustrated electric field detectors 32 are conventional and may also be obtained from Texplor GmbH.

In the illustrated embodiment the liner assembly 23 includes a sensor 24 for each electric field detector 32, that is, there is a one-to-one ratio of sensor 24 to electric field detector 32. The illustrated liner assembly 23 has at least three sensors 24 and at least three electric field detectors 32. The illustrated liner assembly 23 has a minimum area spacing of sensors and electric field detectors of one sensor or one detector per acre of liner.

The liner system 10 further includes a power supply 34 and a data acquisition system 36, see FIG. 3. The power supply 34 applies a voltage difference across the two sides of the sheet 12 through electrical lines 38, 40 that electrically connect positive (+) and negative (−) terminals of the power supply to respective sides of the sheet 12. In the illustrated embodiment the power supply 34 imposes a voltage difference of about 2 millivolts or 3 millivolts on the sheet 12 and generates a current flow of less than one-tenth of an ampere.

The data acquisition system includes signal lines represented by the signal line 42 connected to the electric field detectors 32 that transmit the data generated by the electric field detectors to a central processor or controller. In embodiments the signal lines can be operatively connected to a fieldbus network or other process control network for wired or wireless communication of the electric field data to the processor or controller located at a monitoring station for monitoring the electric field data for changes in operating conditions (leaks, presence of water, etc.).

FIG. 3 illustrates the liner system 10 being used to form an impermeable barrier between water contained in a water containment system 110 and the underlying soil 112. The liner assembly 23 is located within the finished grade 114 above the containment system 110 and so is spaced away from water in the containment system 110. The illustrated system power supply 34 is realized as a solar collector with battery backup.

During construction of the water containment system 110 the integrity of the sheet 12 is continuously monitored by monitoring the electric field data for evidence of water leakage while the water containment system 110 is being constructed over the liner 12 When construction is complete, the integrity of the liner 12 is continuously monitored during the lifetime of the water storage system 110.

Figure 5:
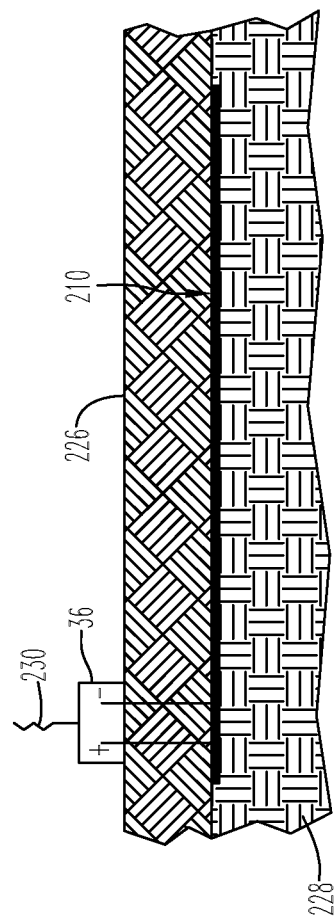
FIG. 5 is a sectional view showing the second embodiment liner system being used to detect when the water table at a location rises to a predetermined distance below grade.

FIG. 4 is a sectional view through the thickness of a liner assembly 223 used in forming part of a second embodiment liner system 210 shown in FIG. 5. The liner assembly 223 is similar to the liner assembly 23 but includes a number of through-holes 224 extending through the thickness of the liner sheet 12. The holes 224 enable water to flow through the thickness of the sheet 12 and fluidly communicate the two sides of the sheet 12.

The liner system 210 is intended to signal the presence or absence of water in the soil in which the liner 12 is placed. FIG. 5 illustrates the liner system 210 placed between a finished grade 226 and the underlying soil 228. The liner system 210 is used to detect the times when the water table reaches the finished grade 226. When the water table is below the finished grade 226, the liner 12 is dry and the two sides of the liner 12 are electrically insulated from one another. When the water table reaches the finished grade 226, water passes through the liner holes 224 and the strength of the electric field in the vicinity of the detectors changes, indicating the water table has reached the finished grade. When the water table falls below the finished grade 226, the liner 12 dries and the strength of the electric field in the vicinity of the detectors again changes, indicating the water table has fallen below the finished grade.

The power supply 34 of the liner system 210 is realized as a DC power supply connected to the utility power grid. The data acquisition system 36 includes an antenna 230 for wireless transmission of electric field data to the monitoring station (not shown).

While one or more embodiments have been disclosed and described in detail, it is understood that this is capable of modification and that the scope of the disclosure is not limited to the precise details set forth but includes modifications obvious to a person of ordinary skill in possession of this disclosure and also such changes and alterations as fall within the purview of the following claims.

What is claimed is:

1. A liner system comprising:
a liner assembly, a power supply electrically connected to the liner assembly, and a data acquisition system;
the liner assembly comprising a liner, a plurality of electrodes, and a plurality of electric field detectors;
the liner comprising opposite first and second sides separated by a thickness of the liner, a first layer on the first side of the liner, a second layer on the second side of the liner, and a third layer between the first and second layers, the first and second layers each being electrically conductive, the third layer being electrically insulating and electrically separating the first and second layers from one another;
the plurality of electrodes comprising a plurality of first electrodes and a plurality of second electrodes, the first electrodes being spaced apart from each other and being attached to and electrically connected to the first layer of the liner, the second electrodes being spaced apart from each other and being attached to and electrically connected to the second layer of the liner, the third layer of the liner being disposed between the plurality of first electrodes and the plurality of second electrodes;
each of the electric field detectors outputting a signal representing the strength of an electric field in the vicinity of the said each electric field detector, the electric field detectors being spaced apart from one another and from the each of the plurality of electrodes, the electric field detectors being attached and electrically connected to the second layer of the liner and not connected to the first layer of the liner;
the power supply having a pair of terminals defining a voltage difference between the pair of voltage terminals, one terminal being electrically connected to the first layer of the liner and the other terminal being electrically connected to the second layer of the liner; and
the data acquisition system being connected to the electric field detectors and receiving the signals from the electric field detectors and outputting data representing the received signals.

2. The liner system of claim 1 wherein each of the first electrodes is embedded in the first layer of the liner.

3. The liner system of claim 1 wherein each of the second electrodes is embedded in the second layer of the liner.

4. The liner system of claim 1 wherein each of the electric field detectors is embedded in the second layer of the liner.

5. The liner system of claim 1 comprising welds attaching the electrodes to the liner.

6. The liner system of claim 1 comprising through holes extending through the liner from the first side of the liner to the second side of the liner.

7. The liner system of claim 1 wherein the power supply comprises a solar panel.

8. The liner system of claim 7 wherein the power supply comprises a battery backup for the solar panel.

9. The liner system of claim 1 wherein the data acquisition system is capable of wireless output of data.

10. The liner system of claim 1 wherein the liner assembly is water-impermeable through the thickness of the liner.

11. The liner system of claim 1 wherein the liner comprises a high-density polyethylene (HDPE) sheet.

12. A liner assembly for a liner system comprising:
a liner, a plurality of sensors, and a plurality of electric field detectors;
the liner comprising a first side, an opposite second side separated by a thickness of the liner from the first side, a first layer on the first side of the liner, a second layer on the second side of the liner, and a third layer between the first layer and the second layer;
the first and second layers each being electrically conductive, the third layer being electrically non-conductive;
the plurality of sensors being spaced apart from one another, each sensor of the plurality of sensors comprising a first electrode attached to and electrically connected to the first layer of the liner and a second electrode attached to and electrically connected to the second layer of the liner, the first and second electrodes being spaced apart from one another and the third layer of the liner being disposed between the first and second electrodes; and
the plurality of electric field detectors being spaced apart from one another, each electric field detector of the plurality of electric field detectors outputting a signal representing the strength of an electric field in the vicinity of said each electric field detector, each electric field detector of the plurality of electric field detectors being attached to and electrically connected to the second layer of the liner and spaced from the first layer of the liner, the third layer of the liner being between the plurality of electric field detectors and the first layer of the liner.

13. The liner assembly of claim 12 wherein the liner comprises high-density polyethylene (HDPE).

14. The liner assembly of claim 12 wherein the first and second layers of the liner each comprises conductive carbon black.

15. The liner assembly of claim 12 wherein the liner is water impermeable.

16. The liner assembly of claim 12 wherein the liner has one or more through-holes extending from the first side of the liner to the second side of the liner, each of the one or more through-holes fluidly connecting the first side of the liner and the second side of the liner.

17. The liner assembly of claim 12 comprising plastic welds attaching the electrodes to the liner.

18. The liner assembly of claim 12 comprising a power supply having a first terminal electrically connected to the first layer of the liner and a second terminal electrically connected to the second layer of the liner, the first and second terminals imposing an AC or DC voltage differential between the first layer of the liner and the second layer of the liner.

19. The liner assembly of claim 12 comprising a data acquisition system operatively connected to the plurality of electric field detectors and operable to receive the data signals from the electric field detectors.

20. The liner assembly of claim 12 wherein the thickness of the liner is not less than 0.040 inches.

* * * * *